United States Patent
Kurihara et al.

(10) Patent No.: US 7,683,005 B2
(45) Date of Patent: Mar. 23, 2010

(54) PHOTOCATALYST, MANUFACTURING METHOD THEREFOR AND ARTICLES COMPRISING PHOTOCATALYST

(75) Inventors: Kazuaki Kurihara, Kawasaki (JP); Masato Wakamura, Kawasaki (JP); Yasuo Naganuma, Kawasaki (JP); Noriyasu Aso, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 623 days.

(21) Appl. No.: 11/390,189

(22) Filed: Mar. 28, 2006

(65) Prior Publication Data

US 2007/0149389 A1 Jun. 28, 2007

(30) Foreign Application Priority Data

Dec. 22, 2005 (JP) ............................ 2005-370233

(51) Int. Cl.
B01J 27/00 (2006.01)
B01J 23/00 (2006.01)
B01D 11/00 (2006.01)
B01F 1/00 (2006.01)
A61L 27/32 (2006.01)

(52) U.S. Cl. .................. 502/208; 502/250; 423/208; 427/2.27

(58) Field of Classification Search ............... 502/208, 502/350; 423/308; 427/2.27
See application file for complete search history.

(56) References Cited

U.S. PATENT DOCUMENTS

| 6,180,548 B1 | 1/2001 | Taoda et al. |
| 2005/0123773 A1* | 6/2005 | Watanabe et al. ........... 428/432 |
| 2005/0196620 A1 | 9/2005 | Watanabe et al. |

FOREIGN PATENT DOCUMENTS

| AU | 600289 B | 1/1988 |
| JP | 08-266897 | 10/1996 |
| JP | 9-57279 | 3/1997 |
| JP | 2000-327315 | 11/2000 |
| JP | 2002-361206 | 12/2002 |
| JP | 2003-088572 A | 3/2003 |
| JP | 2003-089587 * | 3/2003 |
| JP | 2003-089587 A | 3/2003 |
| JP | 3431301 | 5/2003 |
| JP | 3678606 | 5/2005 |

OTHER PUBLICATIONS

"Rapid and complete oxidation of acetaldehyde on TiO2 photocatalytic filter supported by photo-induced activated hydroxyapatite," Harumitsu Nishikawa et al. Journal of Molecular Catalysis A: Chemical 236 (2005), pp. 145-148.*

"Apatite-coated titanium dioxide photocatalyst for air purification," T. Nonami et al. Catalysis Today 96 (2004), pp. 113-118.*

(Continued)

*Primary Examiner*—Patricia L Hailey
(74) *Attorney, Agent, or Firm*—Fujitsu Patent Center

(57) ABSTRACT

A photocatalyst having superior properties of adsorption and decomposition with respect to various substances is provided. This photocatalyst comprises a porous body coated with titanium apatite. The porous body is preferably diatomaceous earth. The photocatalyst can be formed by co-precipitation or a sol-gel method.

9 Claims, 3 Drawing Sheets

OTHER PUBLICATIONS

"Photocatalytic hydroxyapatite/titanium dioxide multilayer thin film deposited onto glass using an rf magnetron sputtering technique," K. Ozeki et al. Applied Surface Science 253 (2007), pp. 3397-3401.*

Masato Wakamura et al., "Photocatalysis by Calcium Hydroxyapatite Modified with . . . ", Langmuir, vol. 19, No. 8, pp. 3428-3431.

"Environmental Clean-up (Purification) Technology by Photocatalyst Titanium Apatite", Fujitsu Laboratories Ltd., Mar. 2005.

Korean Office Action dated Mar. 30, 2007, Application No. 10-2006-0033577.

German Office Action issued on Mar. 20, 2008, issued in corresponding German Patent Application No. DE102006020993.1-41 and English translation.

"German Office Action", Partial English-language translation, mailed Jul. 6, 2009 from DE Patent Office for corresponding DE App. No. 102006020993.

Fukumoto, Masahiro et al., "Formation of Photocatalyst Coating by Thermal Spraying and Effect of Additives on NOx Elimination Property", *Quarterly Journal of the Japan Welding Society*, vol. 22, No. 1, 47-52, 2004, English Abstract.

Japanese Office Action issued in corresponding Japanese Patent Application No. 2005-370233, mailed Mar. 17, 2009.

Satoru Kamigasa, "Use of Diatomaceous Earth as a Photocatalyst Carrier in Water Treatment", Industrial Material, vol. 48, No. 9, Sep. 1, 2000, pp. 51-54.

Fujio Sakamoto, et al., "A study on the Decomposition of Chemical Substances Using the Photocatalyst TiO2(Part 2), No. 41",Research report by Ishikawa Prefectural Institute of Public Health and Environmental Science, Mar. 2007, pp. 95-97.

* cited by examiner

PHOTOCATALYST, MANUFACTURING METHOD THEREFOR AND ARTICLES COMPRISING PHOTOCATALYST

CROSS-REFERENCE TO RELATED APPLICATIONS

This application is based upon and claims the benefit of priority from the prior Japanese Patent Application No. 2005-370233, filed on Dec. 22, 2005, the entire contents of which are incorporated herein by reference.

BACKGROUND OF THE INVENTION

1. Field of the Invention

The present invention relates to a novel photocatalyst for use in articles such as air cleaners, air conditioner filters, wallpapers, curtains and the like which have air cleaning, water cleaning, soil decomposing, antibacterial, sterilizing and other functions. A photocatalyst here is defined as a material capable of breaking down nearby organic compounds, bacteria and other harmful substances by means of ultraviolet or other light rays.

2. Description of the Related Art

The photocatalytic titanium apatite {see, for example, Japanese Patent No. 3,678,606 (claims)} is known to exhibit superior adsorptive properties with respect to various substances (see, for example, Wakamura, Masao et al, *Langmuir* 2003, Vol. 19, p. 3428-3431).

However, titanium apatite is normally in the form of a powder which tends to aggregate and which adsorbs less per unit volume than active charcoal, diatomaceous earth and the like. Consequently, better adsorptive properties are needed for applications such as air cleaning.

SUMMARY OF THE INVENTION

It is an object of the present invention to resolve the aforementioned problems and provide a novel photocatalyst with excellent properties of adsorption and decomposition with respect to various substances. Other objects and advantages of the present invention will be made clear in the following explanation.

One aspect of the present invention provides a photocatalyst comprising a porous body coated with titanium apatite.

It is desirable that the aforementioned porous body be diatomaceous earth, that the photocatalyst has pores present on its surface, that the aforementioned titanium apatite be formed by co-precipitation or that the aforementioned titanium apatite be formed by a sol-gel method, and that the photocatalyst be a sintered body or a mixture with a binder.

Another aspect of the present invention provides a method for manufacturing a photocatalyst comprising a porous body covered with titanium apatite, wherein titanium apatite produced by co-precipitation is deposited on the porous body.

It is desirable that the aforementioned porous body be diatomaceous earth, that the aforementioned porous body be contained in a medium used for forming the titanium apatite during formation of the aforementioned titanium apatite by the aforementioned co-precipitation, that the aforementioned porous body be added to the aforementioned medium following addition to the aforementioned medium of all the raw materials including calcium, titanium and phosphorus which make up the titanium apatite but before addition of the titanium apatite deposition agent is complete, that the aforementioned co-precipitation be performed at a system temperature of 100° C. or less, that the aforementioned deposition be terminated while pores are present on the surface of the aforementioned porous body, and that the aforementioned deposition be terminated by lowering the system temperature and/or filtering a solid product.

Yet another aspect of the present invention provides a method for manufacturing a photocatalyst comprising a porous body coated with titanium apatite wherein the porous body is added to a liquid comprising titanium apatite produced by a sol-gel method, raw materials thereof or an intermediate thereof, causing the titanium apatite to be deposited on the porous body.

It is desirable that the aforementioned porous body be diatomaceous earth, that the titanium apatite-converted titanium concentration (the titanium concentration when converted to titanium apatite) in the liquid comprising the aforementioned titanium apatite produced by the sol-gel method, raw materials thereof or an intermediate thereof be in the range of 0.001 to 0.5% by weight, and that the aforementioned liquid be diluted before addition of the aforementioned porous body.

A photocatalyst with excellent properties of adsorption and decomposition with respect to various substances can be obtained by the aforementioned aspects of the present invention.

Yet another aspect of the present invention provides an article using the aforementioned photocatalyst which is an article having at least one function selected from the group comprising air cleaning, water cleaning, soil decomposition, antibacterial and sterilizing functions, and an article using a photocatalyst manufactured using the aforementioned method for manufacturing a photocatalyst and having at least one function selected from the group comprising air cleaning, water cleaning, soil decomposition, antibacterial and sterilizing functions.

An article having excellent adsorption and decomposition functions with respect to various substances can be obtained with these aspects of the present invention.

A photocatalyst having excellent adsorption and decomposition properties with respect to various substances can be obtained with the present invention.

DESCRIPTION OF THE PREFERRED EMBODIMENTS

Figure 1:
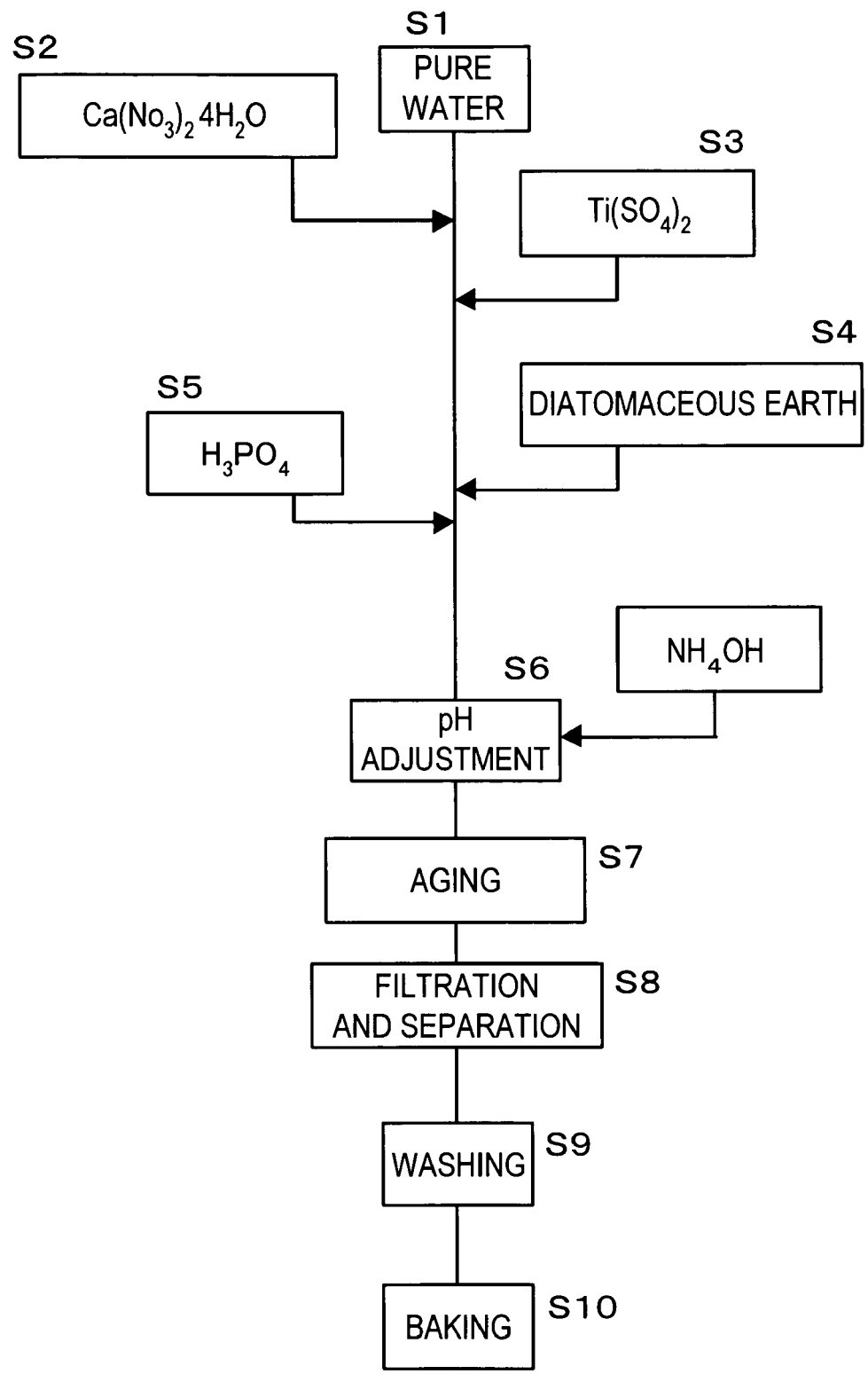
FIG. 1 shows one example of procedures for manufacturing by co-precipitation.

Embodiments of the present invention are explained below using figures, examples and the like. These figures, examples and the like and explanations exemplify the present invention and do not limit its scope. Other embodiments can of course fall within the scope of the present invention to the extent that they match the intent of the present invention.

In the present invention titanium apatite means a substance in which part of calcium apatite has been replaced with titanium, and which is known to have photocatalytic properties (see Fujitsu Laboratories, "Yasashii Gijutsu Koza-Hikarishokubai Gijutsu" [online], revised Mar. 31, 2004, searched Oct. 17, 2005, Internet, http://www.labs.fujitsu.com/jp/gijutsu/catalyst/index.html).

The titanium apatite may be a hydrate. The titanium apatite is represented for example by the formula $Ca_9Ti_1(PO_4)_6(OH)_2$, in which part of the calcium in the calcium hydroxyapatite represented by $Ca_{10}(PO_4)_6(OH)_2$ has been replaced by titanium.

The relative proportions of calcium, titanium and phosphorus in the titanium apatite used in the present invention need not necessarily match exactly that of the aforementioned composition, and for example titanium apatite can be treated as titanium apatite of the present invention if it exhibits a diffraction pattern indicative of an apatite structure when the crystal phase is investigated by x-ray diffraction, if the metal components Ca and Ti of titanium apatite are detected as a result of surface analysis of the powder by XPS, and if it functions as a photocatalyst. A variety of elements can also be included in apatite because it is a strongly ionic crystal which easily undergoes metal ion substitution. Consequently, one that includes elements other than Ca and Ti can be treated as titanium apatite if it has the crystal structure of apatite and a photocatalytic function.

The photocatalytic activity of titanium apatite is often lower than that of titanium dioxide. This is probably because it generally takes the form a powder comprising secondary particles which are aggregations of primary particles with a diameter of about 50 nm, so that the specific surface area is no more than about 30 $m^2/g$. Even if the titanium apatite is pulverized to produce a finer powder, it re-aggregates so that a high specific surface area cannot be obtained, generally making it difficult to improve the photocatalytic activity. In the present invention, "photocatalytic activity" mainly signifies properties of decomposition properties but may also include adsorption properties.

It has been discovered that a photocatalyst comprising a porous body (such as diatomaceous earth) coated with titanium apatite provides superior properties of decomposition and adsorption with respect to various substances to which the photocatalyst is to be applied, such as aldehydes for example. In addition to aldehydes, all objects of air cleaning, water cleaning, soil decomposition, antibacterial and sterilization functions are also objects "to which the photocatalyst is to be applied".

Normally when a porous body such as diatomaceous earth is coated with an agent, there is a problem that the coating does not form within the pores but is limited only to the surface of the particles, or else the coat not only forms within the pores but also fills in the pores, but it is believed that such a problem can be easily averted with the titanium apatite of the present invention.

The porous body used in the present invention is not particularly limited but preferably has a high specific surface area, and when it transmits the ultraviolet light used to produce the photocatalytic effect in the porous body, it preferably has a complex network of pores within the porous body. Examples of the porous body used in the present invention include active charcoal, ceramic porous bodies and diatomaceous earth, but diatomaceous earth is particularly desirable because it transmits the ultraviolet light used to produce the photocatalytic effect in the porous body.

Diatomaceous earth has a specific surface area of about 10 to 100 $m^2/g$, equivalent to that of an ordinary ceramic powder, but is an aggregate of relatively large particles with complex pores rather than an aggregation of fine powder. Because of this special fine structure, it achieves better adsorption of water and various gasses with the same specific surface area. Furthermore, because the principal component of diatomaceous earth is $SiO_2$, it transmits near-ultraviolet light in the range of 350 to 400 nm, which is effective for photocatalysis. Consequently, a titanium apatite coating on the inside of the diatomaceous earth can also be expected to have a photocatalytic function.

There are no particular limits on the way in which the porous body is coated with titanium apatite in the present invention. For example, the porous body may be coated with a film of the coating, or the titanium apatite may form islands with part of the porous body exposed. However, pores are preferably present on the surface of the photocatalyst comprising a porous body coated with titanium apatite of the present invention. That is, indentations which are recognized as pores are preferably present under observation with an electron microscope or the like. This allows the target of the photocatalytic effect to get inside the porous structure so that the photocatalytic effects can be fully achieved. In this case, penetration of the titanium apatite coating inside the pores itself is not a problem and is actually desirable.

From the standpoint of allowing the target of the photocatalytic effect to get inside the porous structure the number of pores should be as large as possible, but since in general the number is inversely proportional to the coating volume of titanium apatite, it will in fact be chosen appropriately out of practical considerations.

For purposes of coating there are no particular limits on the binding force between the porous body and titanium apatite. Under normal conditions there are no practical impediments as long as there is not too much flaking of the titanium apatite from the porous body.

The photocatalyst of the present invention can be in any form in addition to powder form. Examples include lump, sheet and fiber forms and the like.

The catalyst of the present invention comprises a porous body and titanium apatite as essential components, but other substances can be included to the extent that they do not violate the intent of the present invention. Examples of such co-existing substances that can be included are other substances such as titanium oxide having photocatalytic functions, and binders that impart other forms to photocatalysts which are normally powders. Binders include inorganic binders and organic binders. Inorganic binders are typically included when the photocatalyst is a sintered body. Organic binders are typically included to impart a variety of forms to the photocatalyst without high-temperature heat treatment, or in other words when the photocatalyst of the present invention is a mixture with a binder. When the photocatalyst of the present invention is subjected to sintering or other heat treatment, care must be taken so as not to destroy the crystal structure of the titanium apatite, but there are no other special limitations.

The photocatalyst of the present invention can be prepared by so-called wet methods. Examples of wet methods are co-precipitation and a sol-gel method.

Co-precipitation methods are methods of obtaining titanium apatite by including a titanium compound in the course of the synthesis of calcium apatite for co-precipitation. A specific example of a co-precipitation method is a method of adding calcium nitrate, phosphoric acid and titanium sulfate to water as the medium to obtain an acidic aqueous solution, and adding a titanium apatite deposition agent (such as aqueous ammonia) thereto to obtain a deposit.

Water is used as the aforementioned medium. The water used may be of any kind as long as the resulting photocatalyst has the desired properties, but ion exchange water or pure water is preferable for purposes of preventing disturbance to the reaction. Decarbonated water may be preferred in some cases for purposes of preventing the effects of acid.

The sol-gel method is a method of dehydrating a sol of a hydrous oxide or the like into gel which is then heated as necessary and worked into a form such as particles or a film. Normally an inorganic oxide is obtained, but in the present invention titanium apatite or a hydrate thereof is obtained.

Using either method, a titanium apatite powder is normally obtained after filtration, washing, drying and crystallization by heat treatment. Titanium apatite obtained by a method comprising processes other than these processes and titanium apatite obtained by processes other than these processes are also encompassed in the scope of the present invention.

The photocatalyst of the present invention can be obtained by causing titanium apatite produced by co-precipitation to be deposited a porous body. More specifically, the porous body is contained in the medium used for forming the titanium apatite during formation of the titanium apatite by co-precipitation.

In this case, the porous body is preferably added to the aforementioned medium before deposition of the titanium begins in the reaction system. More specifically, it is preferably added before addition of the titanium apatite deposition agent. In general, a titanium apatite deposition agent is an agent that causes deposition of titanium apatite by converting the acidic environment of the reaction system to a basic environment, and a basic substance can be used. The aforementioned aqueous ammonia is preferred. Adding the porous body before all the raw materials including calcium, titanium and phosphorous which make up the titanium apatite have been added to the medium offers no particular advantages and may cause side-reactions, so more strictly it is preferable to add the porous body after all the raw materials including calcium, titanium and phosphorous which make up the titanium apatite have been added to the medium but before addition of the titanium apatite deposition agent.

Adjusting the titanium apatite production rate in the co-precipitation method is often useful for optimizing the photocatalytic activity because it serves to adjust the rate of deposition of titanium apatite on the porous body (and therefore the rate of coating of the porous body by the titanium apatite).

Adjusting the temperature of the system is particularly useful. Raising the temperature of the system normally promotes deposition of titanium apatite, often detracting from photocatalytic activity because the pores on the porous body surface are filled in or particles of titanium apatite alone are deposited. Consequently, in most cases the aforementioned co-precipitation is performed preferably at a system temperature of 100° C. or less.

A method that terminates the aforementioned deposition while pores are still present on the surface of the porous body is useful for purposes of preventing the pores on the surface of the porous body from being filled in. The presence or absence of pores on the surface of the porous body can be easily observed by transmission electron microscopy or the like. Examples of specific methods of terminating deposition include lowering the system temperature and/or filtering the solid product, but any other method is acceptable. Other examples include a method in which the relationship between the system temperature and the rate of decrease in pores on the surface of the porous body is observed in advance by transmission electron microscopy or the like and used to determine the degree and timing of the decrease in system temperature, and a method in which the reaction proceeds at a fixed temperature but the relationship between pore decrease and reaction time is observed in advance by transmission electron microscopy or the like and used to determine the time for filtering the solid product.

In the case of the sol-gel method, deposition of the titanium apatite on the porous body could be caused by adding the porous body to a liquid comprising titanium apatite produced by the sol-gel method, the raw materials thereof or an intermediate thereof. The "titanium apatite produced by the sol-gel method" may be either in sol form or gel form, or may be a mixture of these, but less of the gel form is preferable for purposes of preventing the production of particles of titanium apatite only. A method of adding the porous body at the sol stage or earlier and then gelling to coat the porous body with the titanium apatite is most logical and desirable.

In the sol-gel method, it has been shown that to prevent filling in of the pores on the surface of the porous body as well as deposition of particles of titanium apatite alone, the titanium apatite-converted titanium concentration in a liquid comprising the resulting titanium apatite, the raw materials thereof or an intermediate thereof should be 0.5% by weight or less. There is no particular lower limit, but 0.001% by weight or more is desirable from the standpoint of manufacturing efficiency and the like.

A method of diluting the liquid comprising the resulting titanium apatite or raw materials thereof or an intermediate thereof before addition of the porous body is also useful. In this way, the reaction before dilution can be accomplished efficiently, and it is possible to control filling in of pores on the porous body surface and deposition of particles of titanium apatite alone. There are no particular limits on the time of dilution, but generally it is sufficient that it be before gelling of the titanium apatite.

A photocatalyst obtained as described above can be used to impart at least one function selected from the group comprising air cleaning, water cleaning, soil decomposing, antibacterial and sterilizing functions to a variety of articles. The articles in this case may be articles that are used for these functions, or articles which have these functions in addition to their primary purposes. In the first case examples include air-cleaning devices, water-cleaning devices and the like, while in the second case examples include electronic goods (such as air conditioners), curtains, wallpapers and the like which achieve air cleaning, soil decomposing, antibacterial or sterilizing functions or the like by means of a part which is coated or filled with a photocatalyst.

EXAMPLES

Examples of the present invention are explained in detail below, but the present invention is not limited to these.

Example 1

The procedures for manufacturing a titanium apatite-coated diatomaceous earth by co-precipitation are explained below following the manufacturing flow chart of FIG. 1. Steps S1 through S6 were performed at room temperature.

(1) In step S1, decarbonated pure water was prepared, while in steps S2 and S3 0.1 mole of calcium nitrate and 0.01 mole of titanium sulfate solutions were mixed and agitated with the pure water in a nitrogen atmosphere.

(2) In step S4, a diatomaceous earth powder with an average particle size of 30 μm was added to the solution and the mixture was agitated.

(3) Next, in step S5, 0.06 mole of phosphoric acid was added to the resulting mixture, while 15 mole/L of aqueous ammonia was added to adjust the pH to 9.00 in step S6, and in step S7 the system was aged for 2 hours at 80° C. to raise the temperature and cause deposition of titanium apatite.

(4) Next, in steps S8 and S9, the resulting solid product was collected by filtration, and the isolated solid product was washed with 5 L of pure water and dried for 12 hours in a dry oven at 70° C.

(5) Afterwards, in step S10, this was annealed for 1 hour in atmosphere at 600° C.

When the crystal phase of the resulting powder (titanium apatite-coated diatomaceous earth 1) was investigated by x-ray diffraction, the resulting diffraction pattern indicated an apatite structure. A surface analysis of the powder by XPS revealed peaks for Ca and Ti, which are metal components of titanium apatite, as well as Si and Al, which are metal components of diatomaceous earth. When evaluated by BET, the specific surface area was 87 $m^2/g$, as opposed to a value of 105 $m^2/g$ for diatomaceous earth alone.

Example 2

Figure 2:
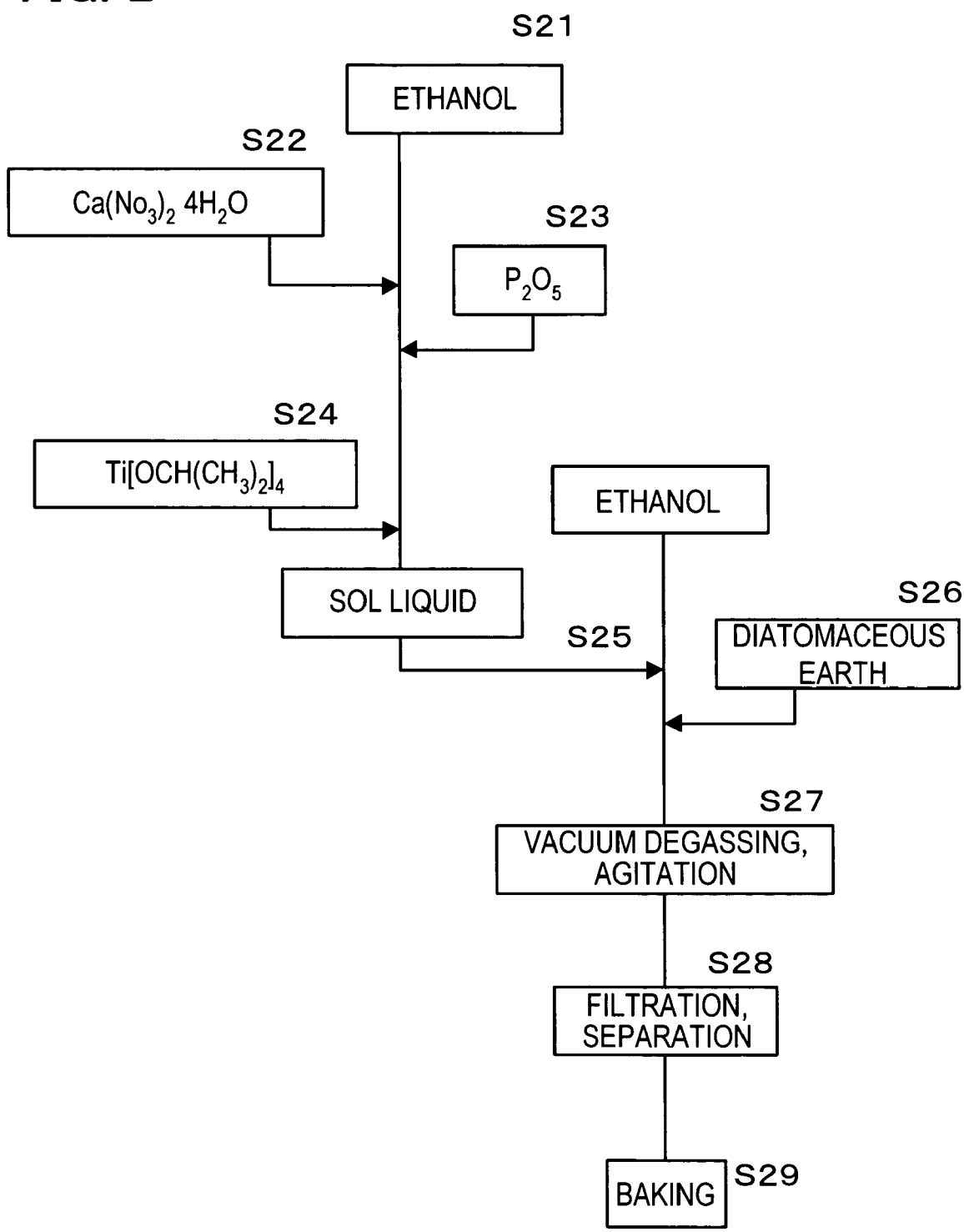
FIG. 2 shows one example of procedures for manufacturing by a sol-gel method.

The procedures for manufacturing a titanium apatite-coated diatomaceous earth by a sol-gel method are explained below following the manufacturing flow chart of FIG. 2. Steps S21 through S28 were performed at room temperature.

(1) In step S21, 100 mL of ethanol (solvent) was prepared, and in step S22, calcium nitrate tetrahydrate (Ca$(NO_3)_2 \cdot 4H_2O$, 2.125 g) was added and agitated at room temperature until the calcium nitrate had completely dissolved.

(2) In step S23, phosphorus pentoxide ($P_2O_5$, 0.4258 g) was added to this solution and the mixture was agitated for a further 2 hours.

(3) In step S24, titanium tetraisopropoxide (Ti[OCH$(CH_3)_2]_4$, 0.2842 g) was added to make a mixed liquid. This mixed liquid was reacted by agitation for about 19 hours at room temperature, to obtain an apatite precursor composition as a light yellow sol.

(4) In step S25, this sol was added to a further 10 L of ethanol, and the mixture was agitated.

(5) In step S26, a diatomaceous earth powder with an average particle size of 30 μm was added to this solution, while in step S27, this was vacuum degassed and then agitated for 10 hours at room temperature.

(6) Next, in step S28, the solid product was filtered and separated, while in step S29 it was dried for 6 hours at 150° C., and annealed for 1 hour in atmosphere at 600° C. to obtain a powder.

When the crystal phase of the resulting powder (titanium apatite-coated diatomaceous earth 2) was analyzed by x-ray diffraction, the resulting diffraction pattern indicated an apatite structure. A surface analysis of the powder by XPS revealed peaks for Ca and Ti, which are metal components of titanium apatite, and Si and Al, which are metal components of diatomaceous earth. When evaluated by BET, the specific surface area was 75 $m^2/g$, as opposed to a value of 105 $m^2/g$ for diatomaceous earth alone.

The adsorption and decomposition properties of powder samples of the titanium apatite-coated diatomaceous earths (that is, photocatalysts of the present invention) obtained in Examples 1 and 2 and various other photocatalysts and adsorbents were investigated under light exposure in acetaldehyde gas. Table 1 shows a list of the samples evaluated.

TABLE 1

| No. | Type | Specific surface area ($m^2/g$) |
|---|---|---|
| 1 | Titanium apatite-coated diatomaceous earth (Example 1) | 87 |
| 2 | Titanium apatite-coated diatomaceous earth (Example 2) | 75 |
| 3 | Diatomaceous earth | 105 |
| 4 | Titanium apatite | 30 |
| 5 | Titanium oxide | 210 |
| 6 | Active charcoal | 180 |

Figure 3:
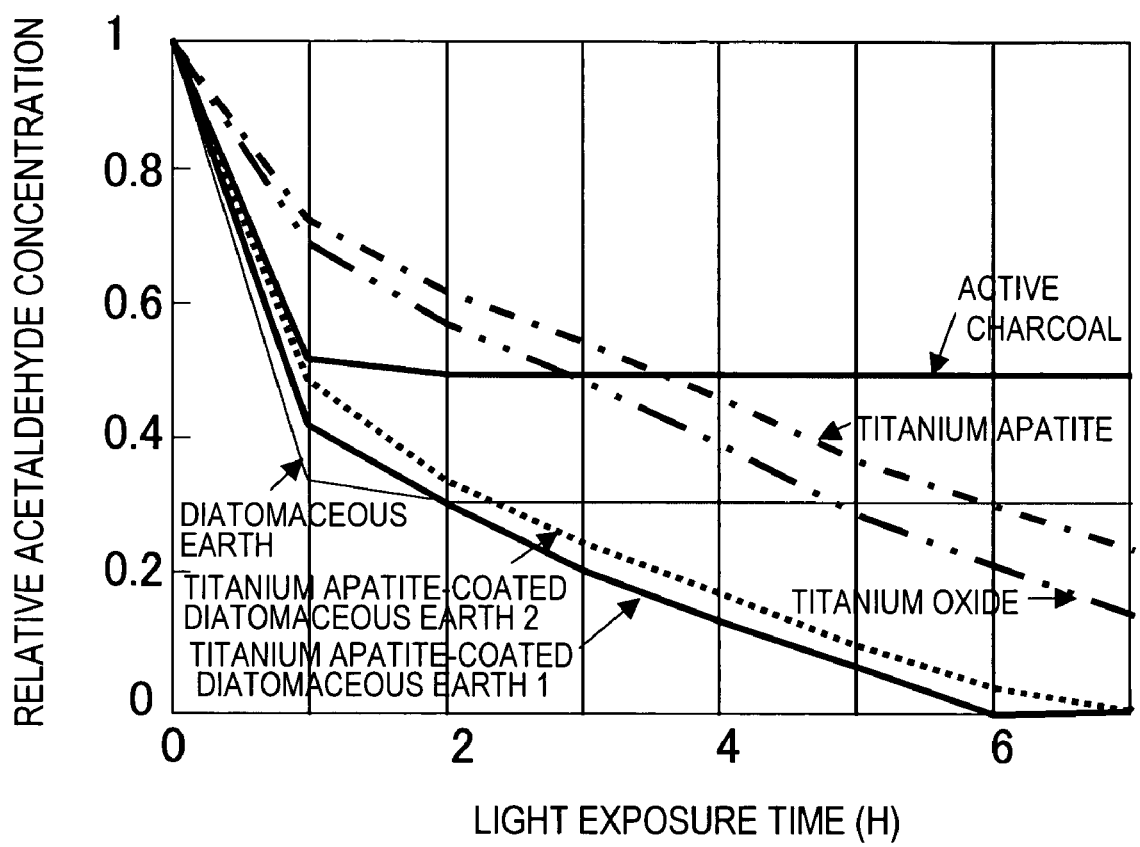
FIG. 3 is a graph showing catalytic activities of various photocatalysts.

The evaluation method was to place equal amounts of the aforementioned powder samples in containers filled with 40 volume ppm of acetaldehyde in air, and measure the changes over time in acetaldehyde concentration by gas chromatography under exposure to 10 mW black light. The measured results are shown in FIG. 3. The horizontal axis shows the light exposure time, while the vertical axis shows the proportion to the original acetaldehyde concentration (40 volume ppm). For example, 0.6 means an acetaldehyde concentration of 40 volume ppm×0.6=24 volume ppm.

In the case of the diatomaceous earth and active charcoal, the aldehyde concentration dropped rapidly initially but then stopped dropping. This means that the diatomaceous earth and active charcoal have only adsorptive ability With titanium apatite or titanium oxide alone, there was no region in which the aldehyde concentration stopped dropping as it did in the case of the diatomaceous earth and active charcoal (that is, they had the ability to decompose the aldehyde), but the initial rate of decrease in aldehyde concentration was smaller than with diatomaceous earth and active charcoal. This seems to mean that titanium apatite and titanium oxide have less adsorptive capacity.

By contrast, with the titanium apatite-coated diatomaceous earths of the present invention the initial rates of decrease in aldehyde concentration were as great as they were with diatomaceous earth and active charcoal (that is, they are as adsorptive as diatomaceous earth and active charcoal), and the subsequent rates of decrease in aldehyde concentration were also high (that is, they also have a strong ability to decompose the aldehyde). Consequently, it can be seen from Table 3 that titanium apatite-coated diatomaceous earth has excellent properties of adsorption and decomposition.

What is claimed is:

1. A method for manufacturing a photocatalyst comprising a porous body coated with titanium apatite, wherein:
    titanium apatite produced by co-precipitation is deposited on the porous body; and
    said porous body is included in a medium used to form the titanium apatite during formation of the titanium apatite by said co-precipitation.

2. The method for manufacturing a photocatalyst according to claim 1, wherein said porous body is diatomaceous earth.

3. The method for manufacturing a photocatalyst according to claim 1, wherein said porous body is added to said medium after addition to said medium of all the raw materials including calcium, titanium and phosphorus which make up the titanium apatite, but before addition of a titanium apatite deposition agent is complete.

4. The method for manufacturing a photocatalyst according to claim 1, wherein said co-precipitation is performed at a system temperature of 100° C. or less.

5. The method for manufacturing a photocatalyst according to claim 1, wherein said deposition is terminated while pores are still present on the surface of said porous body.

6. The method for manufacturing a photocatalyst according to claim 5, wherein said deposition is terminated by lowering the system temperature and/or by filtering a solid product.

7. A method for manufacturing a photocatalyst comprising a porous body coated with titanium apatite, wherein:
   a porous body is added to a liquid comprising titanium apatite produced by a sol-gel method or raw materials thereof or an intermediate thereof, causing said titanium apatite to be deposited on said porous body; and
   the titanium apatite-converted titanium concentration in the liquid comprising titanium apatite produced by the sol-gel method or raw materials thereof or an intermediate thereof is in the range of 0.001 to 0.5% by weight.

8. The method for manufacturing a photocatalyst according to claim 7, wherein said porous body is diatomaceous earth.

9. The method for manufacturing a photocatalyst according to claim 7, wherein said liquid is diluted before addition of said porous body.

* * * * *